(12) United States Patent
Kornilovich et al.

(10) Patent No.: US 11,253,854 B2
(45) Date of Patent: Feb. 22, 2022

(54) MICROFLUIDIC DEVICE

(71) Applicant: Hewlett-Packard Development Company, L.P., Spring, TX (US)

(72) Inventors: Pavel Kornilovich, Corvallis, OR (US); Alexander N. Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 86 days.

(21) Appl. No.: 16/642,978

(22) PCT Filed: Oct. 20, 2017

(86) PCT No.: PCT/US2017/057688
§ 371 (c)(1),
(2) Date: Feb. 28, 2020

(87) PCT Pub. No.: WO2019/078894
PCT Pub. Date: Apr. 25, 2019

(65) Prior Publication Data
US 2020/0306751 A1    Oct. 1, 2020

(51) Int. Cl.
*B01L 3/00* (2006.01)
*F16K 31/12* (2006.01)

(52) U.S. Cl.
CPC .......... *B01L 3/50273* (2013.01); *F16K 31/12* (2013.01); *B01L 2300/0627* (2013.01);
(Continued)

(58) Field of Classification Search
CPC . B01B 1/005; B01D 1/0017; B01L 2200/143; B01L 2300/0627;
(Continued)

(56) References Cited

U.S. PATENT DOCUMENTS 8,609,039 B2   12/2013  Zhou et al.
8,646,482 B2    2/2014  Zhou et al.
(Continued)

FOREIGN PATENT DOCUMENTS

WO    2016024998    2/2016
WO    2016122554    8/2016

OTHER PUBLICATIONS

Lee et al., Microfluidic Mixing: A Review, International Journal of Molecular Sciences, ISSN 1422-0067, 2011, 12, pp. 3263-3287.
(Continued)

*Primary Examiner* — Jennifer Wecker
(74) *Attorney, Agent, or Firm* — Thorpe North & Western LLP

(57) ABSTRACT

A microfluidic device may include a first fluid chamber, a second fluid chamber, a first microfluidic passage extending between the first fluid chamber and the second fluid chamber, a second microfluidic passage extending from the second fluid chamber, a first fluid actuator adjacent the first microfluidic passage and proximate the first fluid chamber to inertially pump fluid away from the first fluid chamber and a second fluid actuator adjacent the first microfluidic passage and proximate the second fluid chamber to menially pump fluid towards the first fluid chamber.

15 Claims, 6 Drawing Sheets

(52) U.S. Cl.
CPC .................. *B01L 2300/0877* (2013.01); *B01L 2300/1827* (2013.01); *B01L 2400/04* (2013.01)

(58) Field of Classification Search
CPC ..... B01L 2300/0877; B01L 2300/1827; B01L 2400/04; B01L 2400/0439; B01L 2400/0445; B01L 3/50273; F16K 31/12
See application file for complete search history.

(56) References Cited

U.S. PATENT DOCUMENTS

| | | |
|---|---|---|
| 9,028,773 B2 | 5/2015 | Ganesan |
| 9,243,624 B2 | 1/2016 | McNamara et al. |
| 2011/0286493 A1 | 11/2011 | Torniainen et al. |
| 2012/0244604 A1* | 9/2012 | Kornilovich ........ B01L 3/50273 435/286.1 |
| 2015/0050172 A1 | 2/2015 | Haupt et al. |

OTHER PUBLICATIONS

Kenis et al., Microfluidics, http://nano-cemms.illinois.edu/media/uploads/content/107/files/micro_nano_fiuidics.20110922093803.pdf.
International Search Report dated Jul. 5, 2018 for PCT/US2017/057688, Applicant Hewlett-Packard Development Company, L.P.

\* cited by examiner

MICROFLUIDIC DEVICE

BACKGROUND

Microfabrication involves the formation of structures and various components on a substrate (e.g., silicon chip, ceramic chip, glass chip, etc.). Examples of microfabricated devices include microfluidic devices. Microfluidic devices include structures and components for conveying, processing, and/or analyzing fluids as well as the chemical and/or biochemical reactions involving such fluids.

Figures 1, 2:
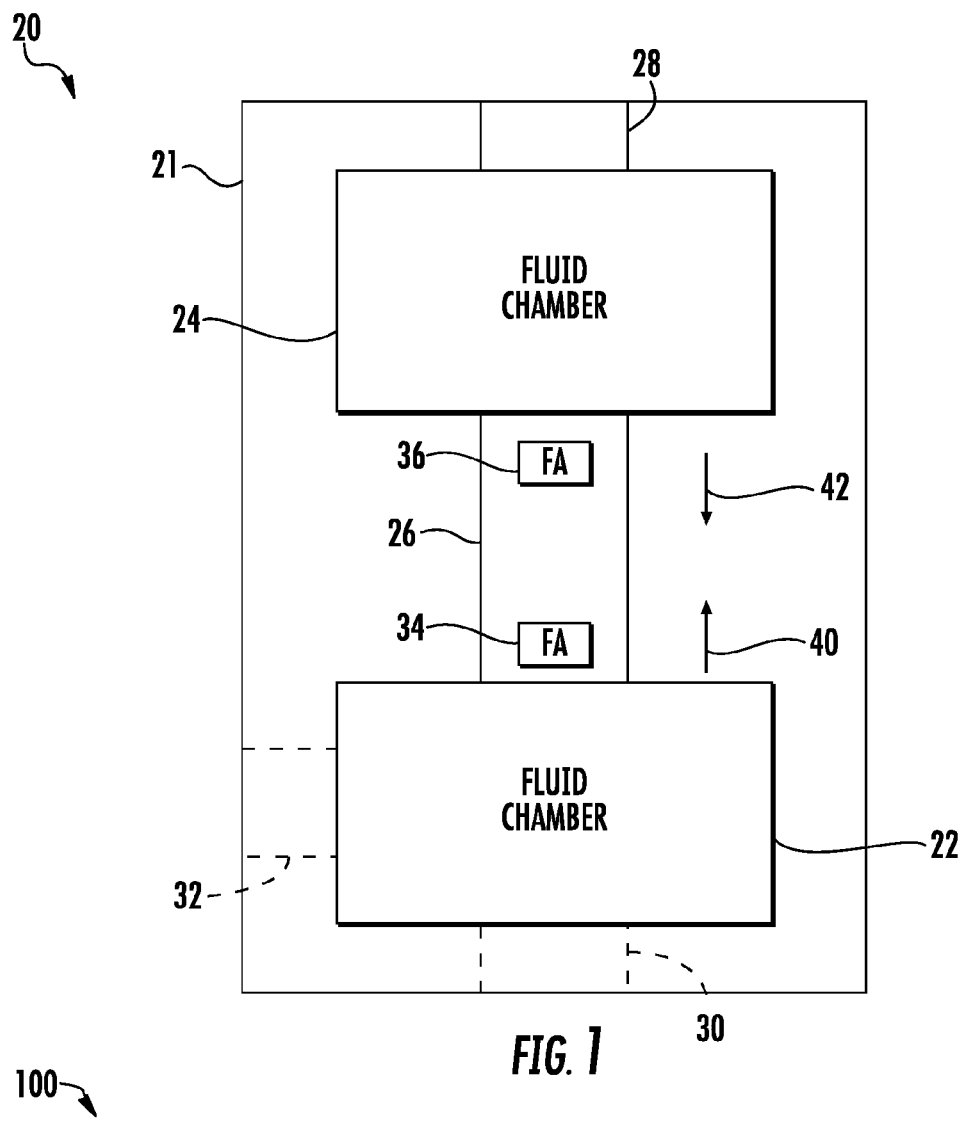
FIG. 1 is a schematic diagram of portions of an example microfluidic device having an example bidirectional inertial pump.
FIG. 2 is a flow diagram of portions of an example method for pumping fluid in a microfluidic device.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings. The schematic diagrams are not drawn to scale.

DETAILED DESCRIPTION OF EXAMPLES

Examples provided herein include devices, methods, and processes for microfluidic devices. Some example microfluidic devices include lab-on-a-chip devices (e.g., polymerase chain reaction devices, chemical sensors, etc.), fluid ejection devices, and/or other such microdevices having microfluidic structures and associated components. Examples described herein may comprise microfluidic channels and fluid actuators disposed therein, where the microfluidic channels may be fluidly coupled together, and the fluid actuators may be actuated to dispense, mix, sense or otherwise interact with microliter, nanoliter and picoliter scale volumes of various fluids.

Example devices may comprise a first fluid chamber, a second fluid chamber, a first microfluidic passage extending between the first fluid chamber and the second fluid chamber, a second microfluidic passage extending from the second fluid chamber, a first fluid actuator adjacent the first microfluidic passage and proximate the first fluid chamber to inertially pump fluid away from the first fluid chamber and a second fluid actuator adjacent the first microfluidic passage and proximate the second fluid chamber to inertially pump fluid towards the first fluid chamber.

Example devices may comprise a first fluid chamber, a second fluid chamber, a first microfluidic passage extending between and connecting the first fluid chamber to the second fluid chamber, a second microfluidic passage extending from the first fluid chamber, a third microfluidic passage extending from the second fluid chamber, a first fluid actuator in the first microfluidic passage to inertially pump fluid towards the first fluid chamber and a second fluid actuator in the first microfluidic passage to inertially pump fluid towards the second fluid chamber.

Example methods may comprise inertially pumping fluid in a first direction in a microfluidic device towards a first fluid chamber with a first fluid actuator adjacent a first microfluidic passage extending between and connecting the first fluid chamber and a second fluid chamber, wherein the second fluid chamber is connected to a second microfluidic passage. The method may further comprise inertially pumping fluid in a second direction away from the first fluid chamber with a second fluid actuator adjacent the first microfluidic passage.

As will be appreciated, examples provided herein may be formed by performing various microfabrication and/or micromachining processes on a substrate to form and/or connect structures and/or components. The substrate may comprise a silicon based wafer or other such similar materials used for microfabricated devices (e.g., glass, gallium arsenide, plastics, etc.). Examples may comprise microfluidic channels, fluid actuators, and/or volumetric chambers. Microfluidic channels and/or chambers may be formed by performing etching, microfabrication processes (e.g., photolithography), or micromachining processes in a substrate. Accordingly, microfluidic channels and/or chambers may be defined by surfaces fabricated in the substrate of a microfluidic device. In some implementations, microfluidic channels and/or chambers may be formed by an overall package, wherein multiple connected package components that combine to form or define the microfluidic channel and/or chamber.

In some examples described herein, at least one dimension of a microfluidic channel and/or capillary chamber may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). For example, some microfluidic channels may facilitate capillary pumping due to capillary force. In addition, examples may couple at least two microfluidic channels to a microfluidic output channel via a fluid junction. At least one fluid actuator may be disposed in each of the at least two microfluidic channels, and the fluid actuators may be selectively actuated to thereby pump fluid into the microfluidic output channel.

The microfluidic channels may facilitate conveyance of different fluids (e.g., liquids having different chemical compounds, different physical properties, different concentrations, etc.) to the microfluidic output channel. In some examples, fluids may have at least one different fluid characteristic, such as vapor pressure, temperature, viscosity, density, contact angle on channel walls, surface tension, and/or heat of vaporization. It will be appreciated that examples disclosed herein may facilitate manipulation of small volumes of liquids.

A fluid actuator, as used herein may correspond to an inertial pump. Fluid actuators that may be implemented as inertial pumps described herein may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In some examples, fluid actuators may be formed in microfluidic channels by performing various microfabrication processes.

In some examples, a fluid actuator may correspond to an inertial pump. As used herein, an inertial pump corresponds to a fluid actuator and related components disposed in an asymmetric position in a microfluidic channel, where an asymmetric position of the fluid actuator corresponds to the fluid actuator being positioned less distance from a first end of a microfluidic channel as compared to a distance to a second end of the microfluidic channel. Accordingly, in some examples, a fluid actuator of an inertial pump is not positioned at a mid-point of a microfluidic channel. The asymmetric positioning of the fluid actuator in the microfluidic channel facilitates an asymmetric response in fluid proximate the fluid actuator that results in fluid displacement when the fluid actuator is actuated. Repeated actuation of the fluid actuator causes a pulse-like flow of fluid through the microfluidic channel.

In some examples, an inertial pump includes a thermal actuator having a heating element (e.g., a thermal resistor) that may be heated to cause a vapor bubble to form in a fluid proximate the heating element. In such examples, a surface of a heating element (having a surface area) may be proximate to a surface of a microfluidic channel in which the heating element is disposed such that fluid in the microfluidic channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such vapor bubble may generate circulation flow of the fluid. As will be appreciated, asymmetries of the expansion-collapse cycle for a bubble may generate such flow for fluid pumping, where such pumping may be referred to as "inertial pumping." In other examples, a fluid actuator corresponding to an inertial pump may comprise a membrane (such as a piezoelectric membrane) that may generate compressive and tensile fluid displacements to thereby cause fluid flow.

As will be appreciated, a fluid actuator may be connected to a controller, and electrical actuation of a fluid actuator (such as a fluid actuator of an inertial pump) by the controller may thereby control pumping of fluid. Actuation of a fluid actuator may be of relatively short duration. In some examples, the fluid actuator may be pulsed at a particular frequency for a particular duration. In some examples, actuation of the fluid actuator may be 1 microsecond (µs) or less. In some examples, actuation of the fluid actuator may be within a range of approximately 0.1 microsecond (µs) to approximately 10 milliseconds (ms). In some examples described herein, actuation of a fluid actuator comprises electrical actuation. In such examples, a controller may be electrically connected to a fluid actuator such that an electrical signal may be transmitted by the controller to the fluid actuator to thereby actuate the fluid actuator. Each fluid actuator of an example microfluidic device may be actuated according to actuation characteristics. Examples of actuation characteristics include, for example, frequency of actuation, duration of actuation, number of pulses per actuation, intensity or amplitude of actuation, phase offset of actuation. As will be appreciated in some examples, at least one actuation characteristic may be different for each fluid actuator. For example, a first fluid actuator may be actuated according to first actuation characteristics and a second fluid actuator may be actuated according to second actuation characteristics, where the actuation characteristics for a respective fluid actuator may be based at least in part on a desired concentration of a respective fluid in a fluid mixture, a fluid characteristic of the respective fluid, a fluid actuator characteristic, the length and cross-sectional area of a respective channel, the location of the actuators relative to each other and relative to the fluid chambers, and/or other such characteristics or input/output variables. For example, the first fluid actuator may be actuated a first number of times and the second fluid actuator may be actuated a second number of times such that a desired concentration of a first fluid and a desired concentration of a second fluid are present in a fluid mixture.

The various passages and fluid chambers are schematically illustrated in the drawings. It should be appreciated that the fluid chambers and microfluidic passages are not drawn to scale. In each case, the fluid chambers each have a diameter or volume sufficiently large to dissipate fluid momentum produced by adjacent fluid actuators such that the adjacent fluid actuators, when activated, inertially pump fluid away from the fluid chambers. In one implementation, each fluid chamber has a diameter or area of at least three times the diameter or cross-sectional area of the connected microfluidic passage in which the adjacent fluid actuator resides.

Turning now to the figures, and particularly to FIG. 1, this figure provides a diagram that illustrates portions of an example microfluidic device 20. Microfluidic device 20 comprises substrate 21, fluid chamber 22, fluid chamber 24, microfluidic passage 26, microfluidic passage 28, fluid actuator 34 and fluid actuator 36. Substrate 21 comprises a base or platform upon which the remaining components of microfluidic device 20 are formed. Substrate 21 serves as a foundation for a microfluidic die. The substrate 21 may comprise a silicon based wafer or other such similar materials used for microfabricated devices (e.g., glass, gallium arsenide, plastics, etc.).

Fluid chamber 22 comprises a volume to contain a fluid. Fluid chamber 22 is sized much larger than microfluidic passage 26 such that fluid momentum within microfluidic passage 26 is dissipated within the volume of fluid chamber 22. In one implementation, fluid chamber 22 has an internal diameter of at least three times the diameter of microfluidic passage 26. In one implementation, fluid chamber 22 comprises a reservoir which is an endpoint a fluid network, storing fluid or providing a supply of fluid. In another implementation, fluid chamber 22 comprises an intermediate fluid chamber, sometimes referred to as a "pseudo-reservoir" wherein additional microfluidic passages, such as microfluidic passages 30 and/or 32 (shown in broken lines) may extend from fluid chamber 22, wherein fluid is pumped through and across fluid chamber 22.

Fluid chamber 24 is similar to fluid chamber 22 except that fluid chamber 24 comprises an intermediate fluid reservoir, a pseudo-reservoir, having an additional passage, microfluidic passage 28, extending from fluid chamber 24. Fluid is to be pumped or driven through and across fluid chamber 24. As with fluid chamber 22, fluid chamber 24 is sized much larger than microfluidic passage 26 such that fluid momentum within microfluidic passage 26 is dissipated within the volume of fluid chamber 24. In one implementation, fluid chamber 24 has an internal diameter of at least three times the diameter of microfluidic passage 26.

Microfluidic passage 26 extends between and directly interconnects fluid chambers 22 and 24. As described above, microfluidic fluid passage 26 has a diameter no greater than one third the size of fluid chambers 22 and 24. Although microfluidic fluid passage 26 is illustrated as being linear and having a constant diameter extending from fluid chamber 22 to fluid chamber 24, in other implementations, microfluidic passage 24 may be nonlinear and may have a varying diameter, wherein the largest diameter in the varying diameter is insufficiently large so as to not dissipate fluid momentum produced by fluid actuator 34, 36. In one implementation, the largest diameter of the varying diameter is not larger than one third the size of the internal volumes or diameters of fluid chambers 22, 24.

Fluid actuators 34, 36 comprise devices that displace fluid to create fluid momentum, wherein fluid actuators 34, 36 cooperate with fluid chambers 22 and 24 to form a bidirectional inertial pump along microfluidic passage 26. Each of fluid actuators 34, 36 are asymmetrically positioned within microfluidic passage 26 between fluid chambers 22 and 24. The asymmetric positioning of fluid actuators 34, 36 within microfluidic passage 26 facilitates an asymmetric response in fluid proximate the fluid actuator that results in fluid displacement when the fluid actuator is actuated. Repeated actuation of the fluid actuator causes a pulse-like flow of fluid through the microfluidic channel. In the example illustrated, fluid actuator 34 is asymmetrically positioned closer to fluid chamber 22 while fluid actuator 36 is asymmetrically positioned closer to fluid chamber 24. As a result, actuation of fluid actuator 34 pumps fluid in microfluidic passage 26 in the direction indicated by arrow 40, drawing fluid out of fluid chamber 22 and moving fluid into and across fluid chamber 24. Actuation of fluid actuator 36 pumps fluid in microfluidic passage 26 in the direction indicated by arrow 42, drawing fluid out of fluid chamber 24 and microfluidic passage 28 a moving fluid into fluid chamber 22 (and across fluid chamber 22 and into microfluidic passage 30 or 32, when provided). The rate of such pumping may be adjusted by controlling the frequency at which fluid actuator 34 and 36 are individually actuated.

In one implementation, fluid actuator 34, 36 may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In some examples, fluid actuators may be formed in microfluidic channels by performing various microfabrication processes. The provision of fluid actuator 36 and the intermediate fluid chamber 24 provide pumping bi-directionality which may be utilized to greatly enhance the flexibility of various fluidic networks in a microfluidic device.

FIG. 2 is a flow diagram of an example method 100 for moving fluid in a microfluidic device. Method 100 utilizes an inertial pump formed by two fluid actuators disposed within a microfluidic passage that extends between two fluid chambers, wherein one of the fluid chambers is a pseudo-reservoir, having an inlet and an outlet. Although method 100 is described as being carried out with the arrangement shown in microfluidic device 20 in FIG. 1, it should be appreciated that method 100 may be carried out with any of the microfluidic devices described hereafter or with similar microfluidic devices.

As indicated by block 104, a first fluid actuator adjacent a first microfluidic passage that extends between and connects first and second fluid chambers is used to inertially pump fluid in a first direction away from the first fluid chamber. The second chamber is connected to a second microfluidic passage. As indicated by block 108, a second fluid actuator adjacent the first microfluidic passage is used to inertially pump fluid and a second direction towards the first fluid chamber.

Figure 3:
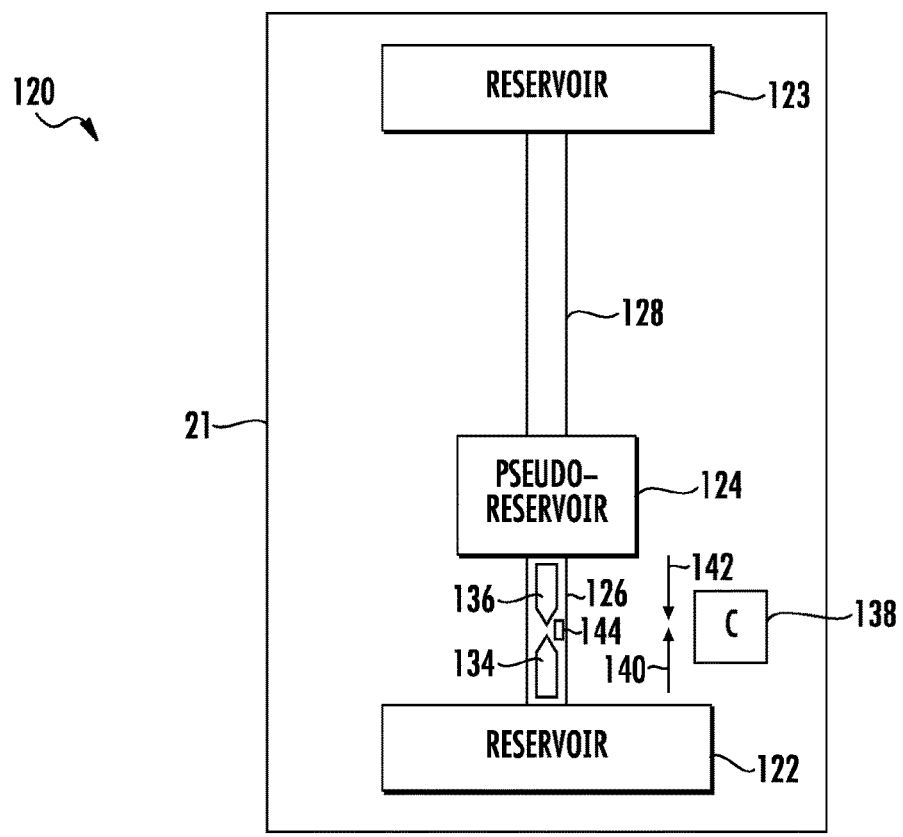
FIG. 3 is a schematic diagram of portions of an example microfluidic device having an example bidirectional inertial pump.

FIG. 3 schematically illustrates portions of an example microfluidic device 120. As with microfluidic device 20, microfluidic device 120 forms a bidirectional inertial pump for moving fluid in opposite directions along a microfluidic passage, into a reservoir or out of a reservoir. Microfluidic device 120 comprises substrate 21 (described above), fluid chamber 122, fluid chamber 123, fluid chamber 124, microfluidic passage 126, microfluidic passage 128, fluid actuator 134, fluid actuator 136 and controller 138.

Fluid chamber 122 comprises a reservoir having a volume to contain a fluid. Fluid chamber 122 is sized much larger than microfluidic passage 126 such that fluid momentum within microfluidic passage 126 is dissipated within the volume of fluid chamber 122. In one implementation, fluid chamber 122 has an internal diameter of at least three times the diameter of microfluidic passage 126. In one implementation, fluid chamber 122 comprises a reservoir which is an endpoint a fluid network, storing fluid or providing a supply of fluid.

Fluid chamber 123 comprises a reservoir having a volume to contain a fluid received from or supplied to microfluidic passage 128. In one implementation, fluid chamber 123 comprises an endpoint a fluid network, storing fluid or providing a supply of fluid. In other implementations, fluid chamber 123 may have outlets connected to other reservoirs or microfluidic passages.

Fluid chamber 124 is similar to fluid chamber 24 described above. Fluid chamber 124 comprises an intermediate fluid reservoir, a pseudo-reservoir, directly connected to microfluidic passage 126 and further directly connected to microfluidic passage 128. Fluid is to be pumped are driven through and across fluid chamber 124. Fluid chamber 124 is sized much larger than microfluidic passage 126 such that fluid momentum within microfluidic passage 126 is dissipated within the volume of fluid chamber 124. In one implementation, fluid chamber 124 has an internal diameter of at least three times the diameter of microfluidic passage 126.

Microfluidic passage 126 extends between and directly interconnects fluid chambers 122 and 124. As described above, microfluidic passage 126 has a diameter no greater than one third the size of fluid chambers 122 and 124. Although microfluidic passage 126 is illustrated as being linear and having a constant diameter extending from fluid chamber 122 to fluid chamber 124, in other implementations, microfluidic passage 124 maybe nonlinear and may have a varying diameter, wherein the largest diameter in the varying diameter is insufficiently large so as to not dissipate fluid momentum produced by fluid actuator 134, 136. In one implementation, the largest diameter of the varying diameter is not larger than one third the size of the internal volumes or diameters of fluid chambers 122, 124.

Fluid actuators 134, 136 comprise devices that displace fluid to create fluid momentum, wherein fluid actuators 134, 136 cooperate with fluid chambers 122 and 124 to form a bidirectional inertial pump along microfluidic passage 126. Each of fluid actuators 134, 136 are asymmetrically positioned within microfluidic passage 126 between fluid chambers 122 and 124. The asymmetric positioning of fluid actuators 134, 136 within microfluidic passage 126 facilitates an asymmetric response in fluid proximate the fluid actuator that results in fluid displacement when the fluid actuator is actuated. Repeated actuation of the fluid actuator causes a pulse-like flow of fluid through the microfluidic channel. In the example illustrated, fluid actuator 134 is asymmetrically positioned closer to fluid chamber 122 while fluid actuator 136 is asymmetrically positioned closer to fluid chamber 124. As a result, actuation of fluid actuator 134 pumps fluid in microfluidic passage 126 in the direction indicated by arrow 140, drawing fluid out of fluid chamber 122 and moving fluid into and across fluid chamber 124. Actuation of fluid actuator 136 pumps fluid in microfluidic passage 126 in the direction indicated by arrow 142, drawing fluid out of fluid chamber 124 and microfluidic passage 128 and moving fluid into fluid chamber 122. The rate of such pumping may be adjusted by controlling the frequency at which fluid actuators 134 and 136 are individually actuated.

In one implementation, each fluid actuator 134, 136 may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In some examples, fluid actuators may be formed in microfluidic channels by performing various microfabrication processes. The provision of fluid actuator 136 and the intermediate fluid chamber 124 provide pumping bidirectionality which may be utilized to greatly enhance the design flexibility in various fluidic networks in a microfluidic device.

Controller 138 comprises a processing unit and associated instructions stored on a non-transitory computer-readable medium. Controller 138 outputs control signals controlling the actuation of actuators 134, 136, depending upon the direction in which fluid is to be pumped within microfluidic passage 126. In some implementations, controller 138 may communicate with a sensor 144 which serves as a flow meter indicating the flow of fluid in response to actuation of fluid actuators 134, 136. Based upon signals from sensor 144, controller 138 may adjust the frequency or other parameters of the ongoing actuation of fluid actuators 134, 136.

Figure 4:
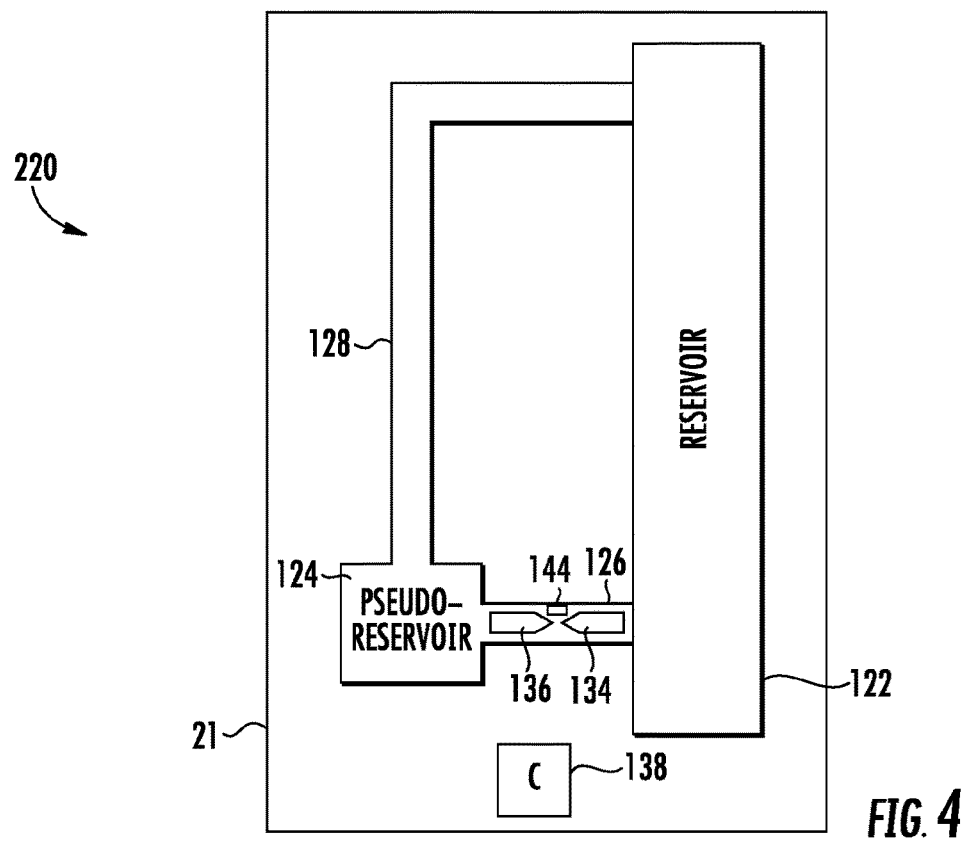
FIG. 4 is a schematic diagram of portions of an example microfluidic device having an example bidirectional inertial pump.

FIG. 4 schematically illustrates portions of an example microfluidic device 220. Microfluidic device 220 is similar to microfluidic device 120 except that microfluidic device 220 omits fluid chamber 123, wherein microfluidic passage 128 is connected back to fluid chamber 122. Microfluidic device 220 facilitates circulation of fluid out of and into reservoir 122. In some implementations, such recirculation may reduce sedimentation of particles within the fluid to enhance performance of the microfluidic device 220. In some implementations, additional active or passive components may be situated along microfluidic passage 128. An active component is a component that receives electrical current for its operation, that receives electrical signals facilitating control of the active component or that outputs electrical signals based upon sensing or other interaction with fluid. An active component may be one that alters a characteristic of the fluid, such as a heater, a mixer, a pump or the like. An active component may be one that senses a characteristic of the fluid without altering a characteristic of the fluid such as an optical sensor, a capacitive sensor, an impedance cell counting sensor, a flowmeter or the like. A passive component is a component that does not rely upon electrical power, or electrical input/output signals. A passive component may comprise a filter, an open channel, a flow diverter, a fluid chamber, a reservoir or the like.

Figure 5:
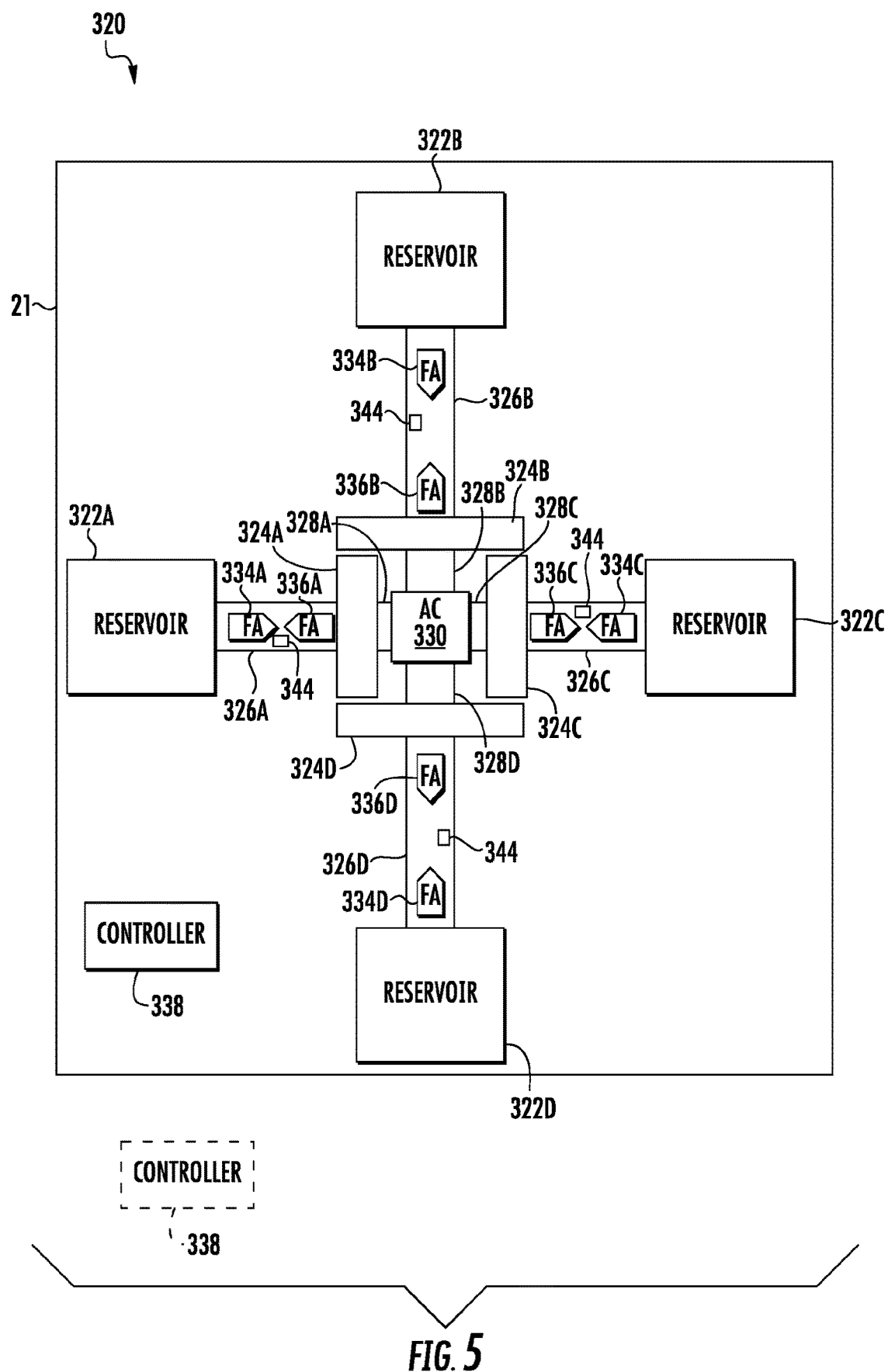
FIG. 5 is a schematic diagram of portions of an example microfluidic device having example bidirectional inertial pumps.

FIG. 5 schematically illustrates portions of an example microfluidic device 320. As with microfluidic devices 20, 120 and 220, microfluidic device 320 utilizes at least one bidirectional inertial pump to control the flow of fluid between consecutive components. Microfluidic device 320 comprises substrate 21, fluid chambers 322A, 322B, 322C, 322D (collectively referred to as fluid chambers 322), fluid chambers 324A, 324B, 324C and 324D (collectively referred to as fluid chambers 324), microfluidic passages 326A, 326B, 326C and 326D (collectively referred to as microfluidic passages 326), microfluidic passages 328A, 328B, 328C, 328D (collectively referred to as microfluidic passages 328), active component 330, fluid actuator pairs 334A, 336A; 334B, 336B, 334C, 3360; and 334D, 336D, and controller 338. Substrate 21 is described above. Fluid actuators 334A-334D are collectively referred to as fluid actuators 334 while fluid actuator 336A-336D are collectively referred to as fluid actuators 336.

Fluid chambers 322 are each similar to fluid chamber 122 described above in that fluid chamber 322 each comprise a reservoir. Each of fluid chambers 322 comprises an endpoint of the illustrated microfluidic network on microfluidic device 320. Each of fluid chambers 322 is to receive and store or supply a fluid. Each fluid chamber 322 has a diameter internal volume greater than the adjacent respective microfluidic passage 326. In one implementation, each fluid chamber 322 has a sufficient internal volume so as to dissipate fluid momentum produced by fluid actuators 334 such that actuations of fluid actuators 334 inertially pump fluid in a direction away from fluid chamber 322. In one implementation, fluid chambers 322 are each to each contain a distinct fluid. In another implementation, some of reservoirs contain distinct fluids with others of reservoirs are to receive fluids interacted upon by active component 330.

Fluid chambers 324 are each similar to fluid chamber 124 described above. Each of fluid chambers 324 forms a pseudo-reservoir, a volume of fluid having an inlet connected to a respective microfluidic passage 326 and an outlet connected to a respective microfluidic passage 328. Each of fluid chambers 324 has a diameter or volume sufficient to dissipate fluid momentum resulting from the actuation of the adjacent respective fluid actuator 336 such that actuation of the fluid actuator 336 pumps fluid in a direction away from fluid chamber 324. In the example illustrated, each of fluid chamber 324 has a diameter of at least three times a diameter of the corresponding microfluidic passage 326.

Microfluidic passages 328 extend between their respective fluid chambers 324 and active component 330. Active component 330 comprises a device that actively interacts with fluid. For example, active component 530 may comprise a micro-electromechanical machine (MEM) component that may perform at least one of mixing, heating or sensing of the fluid. Active component 330 comprises a device or element that interacts with the fluid flow or with particles or components of the fluid flow. For example, in one implementation, active component 330 may comprise a heater, such as an electric resistive heater that emits heat in response to electrical current. In such an implementation, active component 330 may be activated in response to signals from a controller, such as controller 338, to selectively heat the fluid to a selected temperature or by a selected number of degrees as a fluid flows past active component 330.

In another implementation, active component 330 may comprise a device that assists in mixing the fluid as a fluid flows past active component 330. For example, in one implementation, active component 330 may comprise a series or grid of posts or columns through which the fluid flows and is further mixed. In yet other implementations, active 330 may comprise micro-electromechanical structures that physically agitate or vibrates the fluid to mix the fluid.

In yet another implementation, active component 330 may comprise a device that senses attributes or characteristics of the fluid flowing past active component 330. For example, active component 530 may comprise a device that counts the number of cells or particles in the fluid passing across active component 330. In one implementation, active component 330 may comprise an electric field or impedance sensor which establishes an electric field across connecting channels 328, wherein changes in the impedance of the electric field brought about by particles or cells flowing through the electric field is detected and utilized to count the number or rate at which such particles or cells are flowing past active component 330.

In yet another implementation, active component 330 may comprise a sensor that assists in the identification of the fluid or the identification of components in the fluid. For example, active component 330 may comprise a Raman spectroscopy sensor or other optical sensing devices. Through the selective activation of fluid actuators 334, 336, the controller, such as controller 338, may control the mixture composition as well as the rate at which fluid is conveyed across or to the active component 330. In some implementations, signals from active component 330 may be used by the controller to adjust the relative frequencies at which fluid actuators 334, 336 are activated. In yet other implementations, the operation of active component 330 may be controlled based upon the fluid flow rate across connecting channels 528 and/or across active component 330. For example, in implementations where active component 330 comprises a heater, the being output by the heater may be increased by the controller in response to an increased flow rate. In another implementation, the heat being output by active component 330 may be varied based upon the particular mixture of the fluid flowing across the active component, wherein the particular mixture may be dependent upon which reservoirs and associated microfluidic channels are in an input state.

In yet another implementation, active component 330 may comprise a fluid ejector, a device that selectively ejects fluid from the channel or volume in to a receiver such as a waste receptacle or another channel or volume. For example, in one implementation, active component may comprise a fluid ejector having a nozzle, wherein fluid is selectively ejected through the nozzle using a thermal jetting resistor, an actuated membrane or other fluid ejection technology. In still other implementations, active component 330 may comprise a fluid capacitor or a chemical reaction chamber. In other implementations, active component 330 may be omitted, wherein fluid simply flows across microfluidic passages 328.

Fluid actuators 334 are each similar to fluid actuators 134 described above. Fluid actuators 334 are asymmetrically located within their respective microfluidic passages 326, in close proximity to their respective fluid chambers 322. As a result, actuation of fluid actuator 334 results in such actuators 334 inertially pumping fluid away from the respective fluid chambers 322.

Fluid actuators 336 are each similar to fluid actuators 136 described above. Fluid actuator 336 are asymmetrically located within their respective microfluidic passages 326, in close proximity to their respective fluid chambers 324. As a result, actuation of fluid actuator 334 results in such actuators 334 inertially pumping fluid away from the respective fluid chambers 324, towards fluid chamber 322. The combination of fluid actuators 334, 336 and the provision of fluid chamber 324 form four bidirectional inertial pumps.

Controller 338 comprises a processing unit and associated instructions stored on a non-transitory computer-readable medium. In the example illustrated, controller 338 is located on substrate 21. In other implementations, as shown by broken lines, controller 338 may be a remote controller communicating with the various components on substrate 21 through one or more electrical contact pads or the like.

Controller 338 outputs control signals controlling the actuation of actuators 334, 336, to control the flow direction of fluid within microfluidic device 320. In some implementations, controller 338 may communicate with a sensor 344 which serves as a flow meter indicating the flow of fluid in response to actuation of fluid actuators 334, 336. Based upon signals from sensor 344, controller 338 may adjust the frequency or other parameters of the ongoing actuation of fluid actuators 334, 336.

FIG. 5 illustrates one example microfluidic network that may be formed on a microfluidic die. As shown by FIG. 5, fluid may be selectively directed from any of the fluid chamber 322 to active component 330 for sensing, heating and/or mixing. Fluid may be selectively directed back to the same fluid chamber 322 or to a different fluid chamber 322. For example, actuation of fluid actuator 334A inertially pumps fluid through microfluidic passage 326A, across fluid chamber 324A, across microfluidic passage 328A to active component 330. Actuation of fluid actuator 336B may inertially pump and draw the fluid (originating from fluid chamber 322A, after it has been interacted upon by active component 330) through microfluidic passage 328B, across fluid chamber 324B and through microfluidic passage 326B to fluid chamber 322B.

Figure 6:
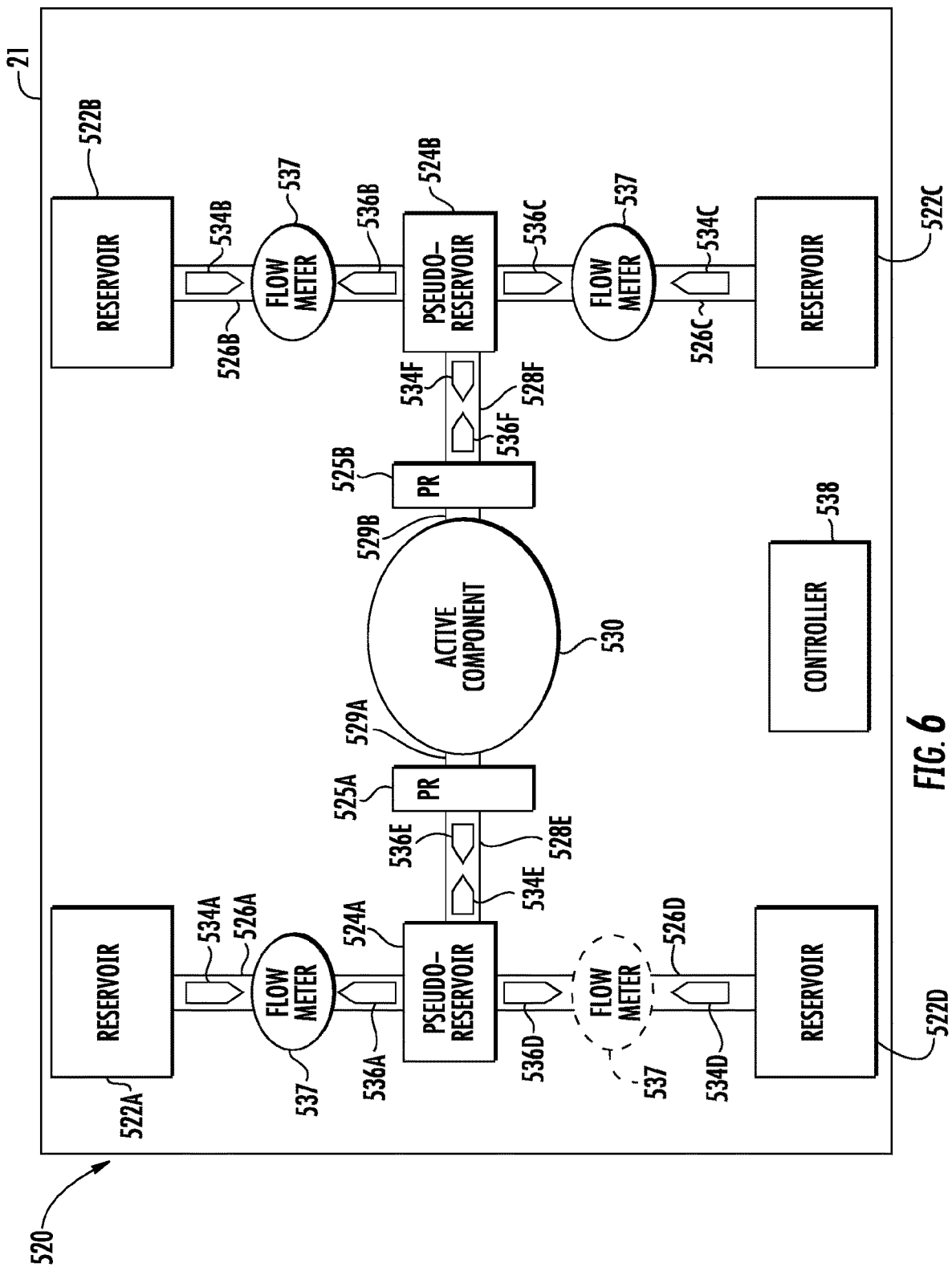
FIG. 6 is a schematic diagram of portions of an example microfluidic device having an example bidirectional inertial pump.

FIG. 6 schematically illustrates portions of an example microfluidic device 520. Microfluidic device 520 is similar in many respects to microfluidic device 320 except that microfluidic device 520 forms bidirectional inertial pumps that share fluid chambers that serve as pseudo-reservoirs, having inlets and outlets and that microfluidic device 520 comprises bidirectional inertial pumps between consecutive fluid chambers 524 serving as pseudo-reservoirs. Microfluidic device 520 comprises substrate 21, fluid chambers 522A, 522B, 522C and 522C (collectively referred to as fluid chambers 522), fluid chambers 524A, 524B (collectively referred to as fluid chambers 524), fluid chambers 525A, 525B (collectively referred to as fluid chambers 525), microfluidic passages 526A, 526B, 526C and 526D (collectively referred to as microfluidic passages 526), microfluidic passages 528E, 528F (collectively referred to as microfluidic passages 528), active component 530, fluid actuator pairs 534A, 536B, 534B, 536B, 534C, 536C, 534D, 536D, 534E, 536E, 534F, 536F, flow meters 537 and controller 538. Fluid actuators 534A-534F are collectively referred to as fluid actuators 534 while fluid actuators 536A-536F are collectively referred to as fluid actuators 536. Substrate 21 is described above.

Fluid chambers 522 are each similar to fluid chamber 122 described above in that fluid chambers 522 each comprise a reservoir. Each of fluid chambers 522 comprises an endpoint of the illustrated microfluidic network on microfluidic device 520. Each of fluid chambers 522 is to receive and store or supply a fluid. Each fluid chamber 522 has a diameter internal volume greater than the adjacent respective microfluidic passage 526. In one implementation come each fluid chamber 322 has a sufficient internal volume so as to dissipate fluid momentum produced by fluid actuators 334 such that actuations of fluid actuators 334 inertially pump fluid in a direction away from fluid chamber 322. In one implementation, fluid chambers 322 are each to each contain a distinct fluid. In another implementation, some of reservoirs contain distinct fluids with others of reservoirs are to receive fluids interacted upon by active component 330.

Fluid chambers 524 are each similar to fluid chamber 124 described above except that fluid chambers 524 are each connected to a pair of microfluidic passages 526. Fluid chamber 524A is directly connected to both fluid passage 526A and 526D. Fluid chamber 524B is directly connected to both fluid passages 526B and 526C. Each of fluid chambers 524 has a diameter or volume sufficient to dissipate fluid momentum resulting from the actuation of the adjacent respective fluid actuator 336 such that actuation of the fluid actuator 336 pumps fluid in a direction away from fluid chamber 524. In the example illustrated, each of fluid chamber 524 has a diameter of at least three times a diameter of the fluid passages 526 that are connected to the fluid chamber 524.

Microfluidic passages 526 extend from fluid chambers 524 and contain the respective fluid actuator pairs. Microfluidic passage 526A extends from fluid chamber 522A to fluid chamber 524A. Microfluidic passage 526B extend from fluid chamber 522A to fluid chamber 524B. Microfluidic passage 526C extends from fluid chamber 522C to fluid chamber 524B. Microfluidic passage 526D extends from fluid chamber 522D to fluid chamber 524A. Each of microfluidic passages 526 has a diameter or cross-sectional area no greater than one third the diameter or inlet area of its respective fluid chamber 522.

Microfluidic passages 528 extend between fluid chambers 524 and 525. Microfluidic passage 528A extend between fluid chamber 524A and fluid chamber 525A. Microfluidic passage 528B extend between fluid chamber 524B and fluid chamber 525B. Microfluidic passages 529A and 529B extend between fluid chambers 525A and 525B, respectively, and active component 530.

Active component 530 comprises a device that actively interacts with fluid. For example, active component 530 may comprise a micro-electromechanical machine (MEM) component that may perform at least one of mixing, heating or sensing of the fluid. Active component 530 comprises a device or element that interacts with the fluid flow or with particles or components of the fluid flow. For example, in one implementation, active component 530 may comprise a heater, such as an electric resistive heater that emits heat in response to electrical current. In such an implementation, active component 530 may be activated in response to signals from a controller, such as controller 260, to selectively heat the fluid to a selected temperature or by a selected number of degrees as a fluid flows past active component 530.

In another implementation, active component 530 may comprise a device that assists in mixing the fluid as a fluid flows past active component 530. For example, in one implementation, active component 530 may comprise a series or grid of posts or columns through which the fluid flows and is further mixed. In yet other implementations, active 530 may comprise micro-electromechanical structures that physically agitate or vibrates the fluid to mix the fluid.

In yet another implementation, active component 530 may comprise a device that senses attributes or characteristics of the fluid flowing past active component 530. For example, active component 530 may comprise a device that counts the number of cells or particles in the fluid passing across active component 530. In one implementation, active component 530 may comprise an electric field or impedance sensor which establishes an electric field across connecting channel 438, wherein changes in the impedance of the electric field brought about by particles or cells flowing through the electric field is detected and utilized to count the number or rate at which such particles or cells are flowing past active component 530.

In yet another implementation, active component 530 may comprise a sensor that assists in the identification of the fluid or the identification of components in the fluid. For example, active component 530 may comprise a Raman spectroscopy sensor or other optical sensing devices. Through the selective activation of fluid actuators 534, 536, the controller, such as controller 538, may control the mixture composition as well as the rate at which fluid is conveyed across or to the active component 530. In some implementations, signals from active component 530 may be used by the controller to adjust the relative frequencies at which fluid actuators 36 are activated. In yet other implementations, the operation of active component 530 may be controlled based upon the fluid flow rate across connecting channels 528 and/or across active component 530. For example, in implementations where active component 530 comprises a heater, the being output by the heater may be increased by the controller in response to an increased flow rate. In another implementation, the heat being output by active component 530 may be varied based upon the particular mixture of the fluid flowing across the active component, wherein the particular mixture may be dependent upon which reservoirs and associated microfluidic channels are in an input state.

In yet another implementation, active component 530 may comprise a fluid ejector, a device that selectively ejects fluid from the channel or volume in to a receiver such as a waste receptacle or another channel or volume. For example, in one implementation, active component may comprise a fluid ejector having a nozzle, wherein fluid is selectively ejected through the nozzle using a bubble jet resistor, and actuated membrane or other fluid ejection technology. In still other implementations, active component 530 may comprise a fluid capacitor or a chemical reaction chamber. In other implementations, active component 530 may be omitted, wherein fluid simply flows across microfluidic passages 529.

Fluid actuators 534A-534D are each similar to fluid actuators 134 described above. Fluid actuators 534 are asymmetrically located within their respective microfluidic passages 526, in close proximity to their respective fluid chambers 522. As a result, actuation of fluid actuator 534 results in such actuators 534 inertially pumping fluid away from the respective fluid chambers 522.

Fluid actuators 536A-536D are each similar to fluid actuators 136 described above. Fluid actuator 536 are asymmetrically located within their respective microfluidic passages 526, in close proximity to their respective fluid chambers 524. As a result, actuation of fluid actuator 534 results in the fluid actuator 534 inertially pumping fluid away from the adjacent fluid chamber 524 towards the adjacent fluid chamber 522.

Fluid actuators 534E and 534F are similar to fluid actuators 134 described above except that fluid actuators 534E and 534F are asymmetrically positioned within microfluidic passages 528E and 528F in close proximity to fluid chambers 524E and 524F, respectively, so as to inertially pump fluid away from chambers 524E and 524F, towards chambers 525A and 525B, respectively, and active component 530.

Fluid actuators 536E and 536F are similar to fluid actuators 136 described above except that fluid actuators 534E and 534F are asymmetrically position within microfluidic passages 528E and 528F in close proximity to fluid chambers 525A and 525B, respectively, so as to inertially pump fluid away from chambers 525A and 525B, towards chambers 524A and 524B, respectively, and away from active component 530. The combination of fluid actuators 534, 536 and the provision of fluid chambers 524, 525 forms six bidirectional inertial pumps that utilize just for pseudo-reservoirs, fluid chambers 524 and 525.

Flow meters 537 comprise devices that sense or detect the flow of fluid. In the example illustrated, a flow meter 537 is provided in each microfluidic passage 526 to sense and output signals indicating the rate of fluid flow. Such signals are communicated to the controller, such as controller 538 that controls the activation, such as a frequency of activation of fluid actuators 534 and 536. Flow meters 537 provide closed-loop feedback to the controller such that the controller may iteratively and dynamically adjust the frequency at which fluid actuators 534 and 536 are activated to more precisely achieve a desired flow rate and a desired relative flow rate.

Controller 538 comprises a processing unit and associated instructions stored on a non-transitory computer-readable medium. In the example illustrated, controller 538 is located on substrate 21. In other implementations, as shown by broken lines, controller 338 may be a remote controller communicating with the various components on substrate 21 through one or more electrical contact pads or the like.

Controller 538 outputs control signals controlling the actuation of actuators 534, 536, to control the flow direction of fluid within microfluidic device 320. Controller 53 may additionally output control signals controlling active component 530.

Figure 7:
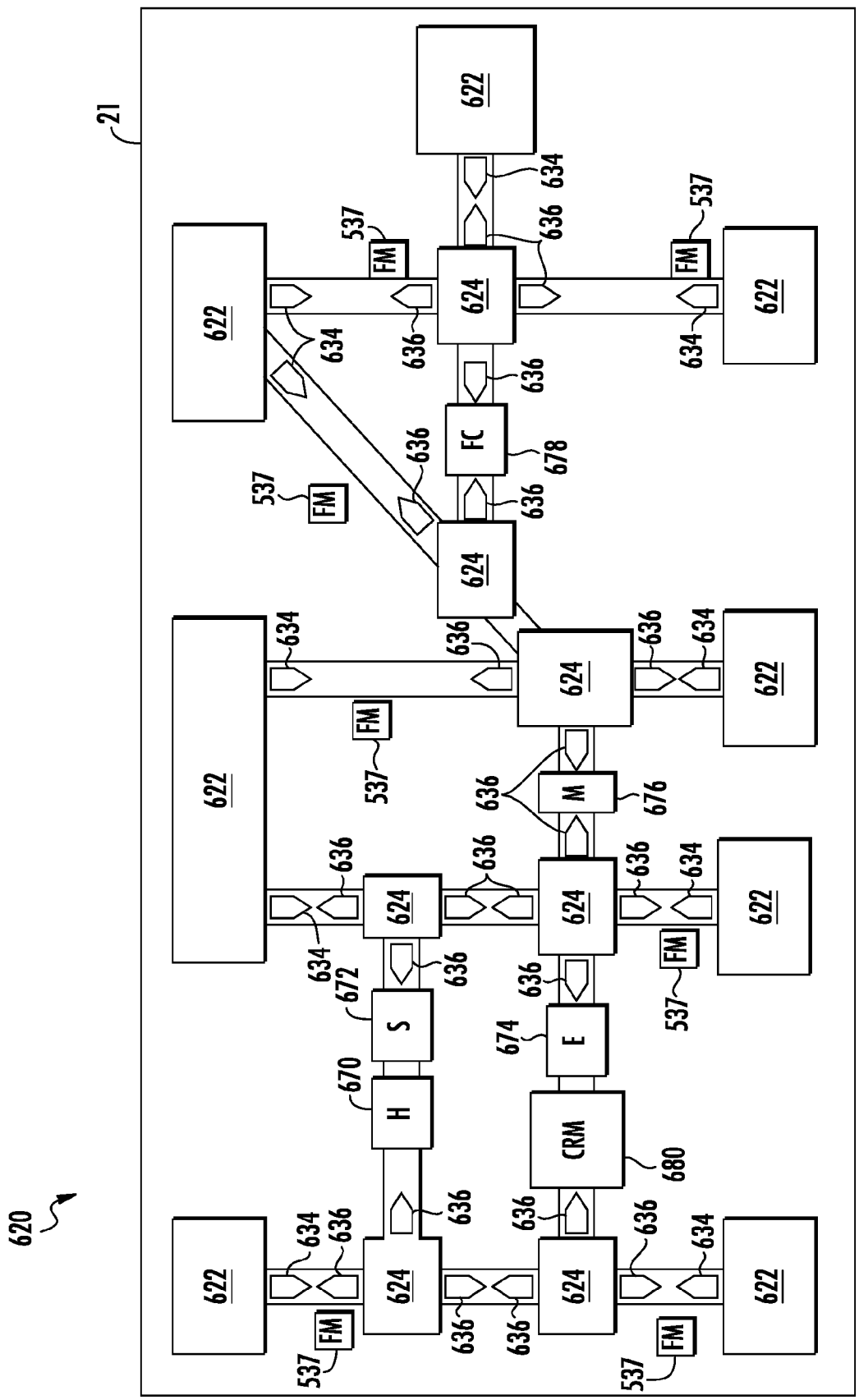
FIG. 7 is a schematic diagram of portions of an example microfluidic device having example bidirectional inertial pumps.

FIG. 7 is a diagram schematically illustrating portions of an example microfluidic device 620. Microfluidic device 1320 illustrates another example network or microfluidic "switchboard" comprising asymmetrically located fluid actuators that cooperate with pseudo-reservoirs or intermediate fluid chambers to provide multiple bidirectional inertial pumps. Microfluidic device 620 comprises multiple fluid chambers 622, pseudo-reservoir fluid chambers 624, microfluidic passages 626, flow meters 537 and various active components in the form of a heater 670, a fluid sensor 672, a fluid ejector 674, a fluid mixer 676, a fluid capacitor 678 and a chemical reaction chamber 680. Each of the different types of active components are described above.

Fluid chambers 622 are in the form of fluid reservoirs. Fluid chamber 622 are each similar to fluid chambers 122 described above. Each of fluid chamber 622 comprise an endpoint for storing a fluid.

Pseudo-reservoir fluid chamber 624 are similar to fluid chambers 124, 324 and 524 described above. Fluid chambers 624 provide volumes in which fluid momentum from the adjacent fluid actuators 636 is dissipated such that actuation of the adjacent fluid actuators 636 inertially pump fluid away from chambers 624. Each of fluid chamber 624 has at least two inlet/outlet ports such that such chamber 624 serve as pass-throughs, the pump fluid passing through chamber 624. In one implementation, such fluid chambers 624 do not include any active component and do not alter or carryout sensing with regard to the fluid.

Fluid actuators 634 are similar to fluid actuators 134, 334 and 534 described above. Each of fluid actuators 634 is asymmetrically positioned (closer to one end versus the other end) within a microfluidic passage in closer proximity to a fluid chamber 622 such that upon actuation, each fluid actuator 634 inertially pumps fluid away from its associated fluid chamber 622. Fluid actuators 636 are similar to fluid actuators 136, 336 and 536 described above. Each of fluid actuators 636 is asymmetrically positioned within a microfluidic passage in closer proximity to a pseudo-reservoir fluid chamber 624 such that upon actuation, each fluid actuator 636 inertially pumps fluid away from its associated fluid chamber 624. The multiple bidirectional inertial pump provided by fluid actuators 634, 636 provide enhanced control over the flow of fluid in microfluidic device 620 between the various active components.

Figure 8:
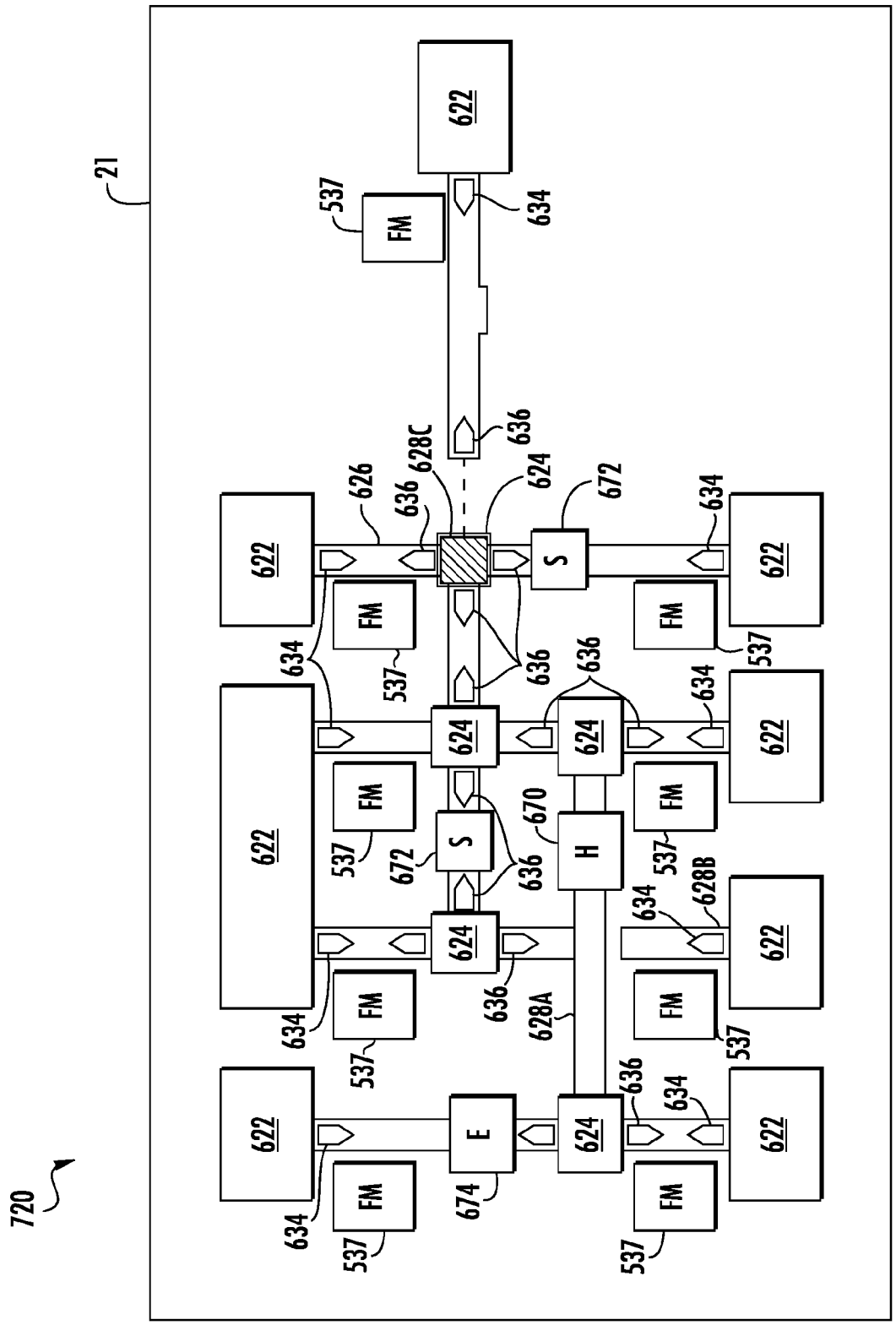
FIG. 8 is a schematic diagram of portions of an example microfluidic device having example bidirectional inertial pumps.

FIG. 8 is a diagram schematically illustrating portions of an example microfluidic device 720. Microfluidic device 720 illustrates another example network or microfluidic "switchboard" comprising asymmetrically located fluid actuators that cooperate with pseudo-reservoirs or intermediate fluid chambers to provide multiple bidirectional inertial pumps. Microfluidic device 620 comprises multiple fluid chambers 622, pseudo-reservoir fluid chambers 624, microfluidic passages 626, flow meters 537 and various active components in the form of a heater 670, a fluid sensor 672, a fluid ejector 674, a fluid mixer 676, a fluid capacitor 678 and a chemical reaction chamber 680, each of which is described above.

As further illustrated by FIG. 8, microfluidic device 720 comprises microfluidic passages 626 having a three-dimensional architecture. In other words, microfluidic channels passages 626 extend within different planes. In the example illustrated, microfluidic passage 626 have centerlines that extend within different planes and that extend in all three orthogonal directions, along the x-axis, the y-axis and the z-axis. As shown by FIG. 8, the example microfluidic device 720 specifically includes a microfluidic passage 628A that extends over or bridges over an underlying microfluidic passage 628B. in the example illustrated, microfluidic device 720 further comprises a microfluidic passage 628C that extends in the z-axis (out of the plane of the drawing sheet as indicated by hatching) and is connected to a fluid chamber 622 above the other reservoirs. The three dimensionality of microfluidic device 720 provides a complex network or "switchboard" that may be compact.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A microfluidic device comprising:
a first fluid chamber;
a second fluid chamber;
a first microfluidic passage extending between the first fluid chamber and the second fluid chamber;
a second microfluidic passage extending from the second fluid chamber;
a first fluid actuator adjacent the first microfluidic passage and proximate the first fluid chamber and configured to inertially pump fluid away from the first fluid chamber towards the second fluid chamber through the first microfluidic passage; and
a second fluid actuator adjacent the first microfluidic passage and proximate the second fluid chamber and configured to inertially pump fluid away from the second fluid chamber towards the first fluid chamber through the first microfluidic passage.

2. The microfluidic device of claim 1 further comprising a third microfluidic passage extending from the first fluid chamber.

3. The microfluidic device of claim 1 further comprising a third fluid chamber, the second microfluidic passage extending between and connecting the second fluid chamber and the third fluid chamber.

4. The microfluidic device of claim 1, wherein the second microfluidic passage extends between and interconnects the second fluid chamber and the first fluid chamber.

5. The microfluidic device of claim 1, wherein the first fluid actuator and the second fluid actuator each comprise a thermal resistor.

6. The microfluidic device of claim 1 further comprising an active component fluidly coupled to the second microfluidic passage.

7. The microfluidic device of claim 6, wherein the active component selected from a group of active components consisting of: a fluid ejector, a fluid characteristic sensor, a fluid heater, a fluid mixer, a chemical reaction chamber, a fluid ejector and a fluid capacitor.

8. The microfluidic device of claim 1, wherein the first microfluidic passage has a first internal dimension and wherein second fluid chamber has a second internal dimension at least thrice the first internal dimension.

9. The microfluidic device of claim 1 further comprising at least one flow sensor to sense flow within the first microfluidic passage.

10. The microfluidic device of claim 9 further comprising a controller to output control signals controlling the actuation of the first fluid actuator and the second fluid actuator based upon the control signals.

11. A method comprising:
inertially pumping fluid in a first direction through a first microfluidic passage in a microfluidic device away from a first fluid chamber with a first fluid actuator proximate the first fluid chamber and adjacent the first microfluidic passage, wherein the first microfluidic passage extends between and connects the first fluid chamber and a second fluid chamber, the second fluid chamber being connected to a second microfluidic passage; and
inertially pumping fluid in a second direction through the first microfluidic passage towards the first fluid chamber with a second fluid actuator proximate the second fluid chamber and adjacent the first microfluidic passage.

12. The method of claim 11 further comprising sensing fluid flow within the first microfluidic passage.

13. The method of claim 11 further comprising adjusting actuation of at least one of the first fluid actuator and the second fluid actuator based upon sensed fluid flow within the first microfluidic passage.

14. The method of claim 11 further comprising inertially pumping fluid within the first microfluidic passage to move fluid through the second fluid chamber to a destination, the destination selected from a group of destinations consisting of: the first fluid chamber; a second fluid chamber and an active component.

15. A microfluidic device comprising:
a first fluid chamber;
a second fluid chamber;
a first microfluidic passage extending between and connecting the first fluid chamber to the second fluid chamber;
a second microfluidic passage extending from the first fluid chamber;
a third microfluidic passage extending from the second fluid chamber;
a first fluid actuator in the first microfluidic passage and configured to inertially pump fluid through the first microfluidic passage towards the first fluid chamber; and
a second fluid actuator in the first microfluidic passage and configured to inertially pump fluid through the first microfluidic passage towards the second fluid chamber.

* * * * *